Figure 1:
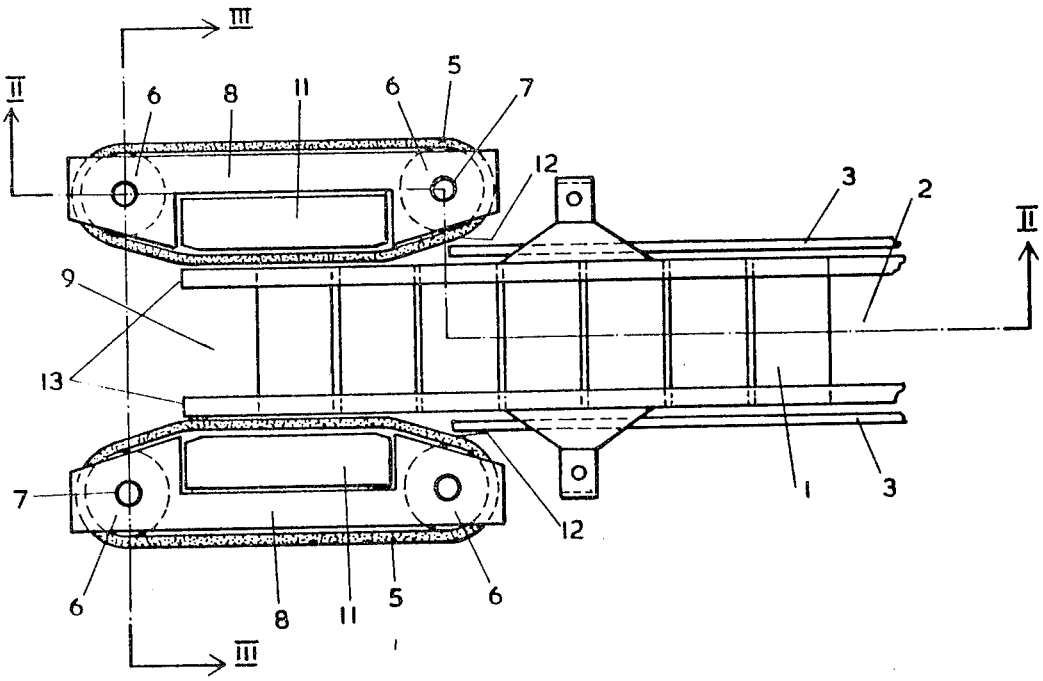
Figure 2:
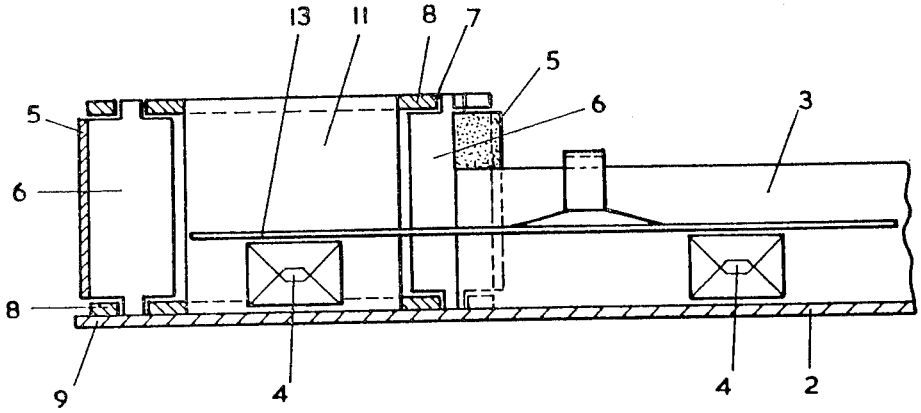
Figure 3:
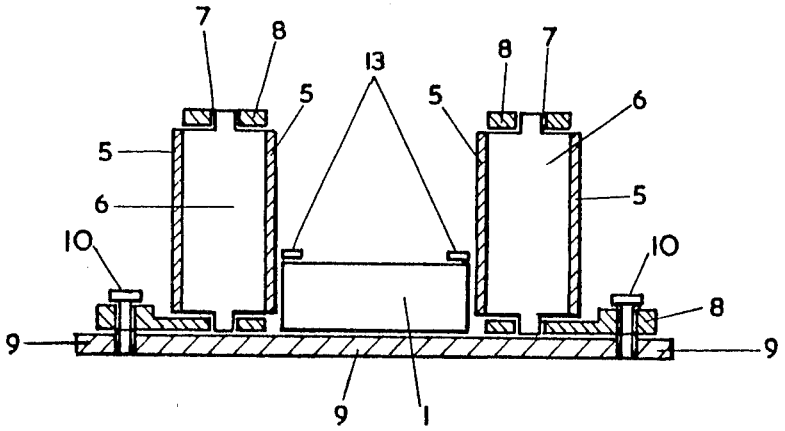

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 10

T934,011
PACKET SEALER

Peter Wray, Welwyn Garden City, England, assignor to Imperial Chemical Industries Limited, London, England

Filed June 24, 1974, Ser. No. 482,602
**Int. Cl. B65b *51/18***
U.S. Cl. 53—39
2 Sheets Drawing. 21 Pages Specification

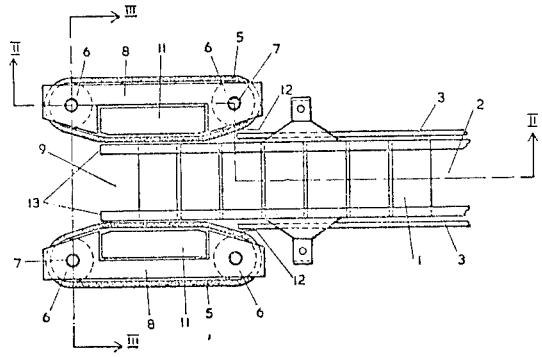

A method and apparatus are disclosed for sealing a protective or decorative wrapping material, such as a heat-sealable synthetic polymeric film, about a package, the method particularly adapted to seal the more resilient types of polymeric wrapping materials such as polyolefin or polyester films. According to the disclosed method a wrapped packet is conveyed past a member positioned to retain the folded wrapper in position on the packet while a movable surface is maintained between the wrapped packet and the retaining member. Next the surface is advanced, but only by engagement with the wrapped packet, relative to the retaining member in the direction of motion of and at substantially the same speed as that of the wrapped packet. Sealing is effected by supplying sufficient energy such as heat to the area of the wrapper in contact with the moving surface to seal the wrapper in that area of contact.

ERRATUM

In the notice of Defensive Publication T934,011 appearing on page 10 in the OFFICIAL GAZETTE of May 6, 1975, three paragraphs of the abstract following the printed paragraph were omitted and should be added. The three paragraphs are as follows:

> Of particular importance is a running surface maintained between the retaining member and the wrapped packet surface, the running surface moving in the same direction and speed of the packet. This surface is conveniently an endless belt of a synthetic polymeric film, for example a polyester optionally coated with a PTFE lubricant, and is used to avoid frictional drag being placed on the packet.
>
> Other acceptable wrapping materials include wrappers coated with an adhesive, for instance a heat-sealable adhesive as copolymers of vinylidene chloride with acrylonitrile.
>
> The method and apparatus are particularly adapted to wrap packets of a cubical or right rectangular configurations in batch-type operations or integration into a packet-filling and wrapping production line.

U. S. GOVERNMENT PRINTING OFFICE : O - 1975

PACKET SEALER

Filed June 24, 1974 2 Sheets-Sheet 1

PACKET SEALER

Filed June 24, 1974 2 Sheets-Sheet 2